(12) United States Patent
Pfarr et al.

(10) Patent No.: US 11,735,900 B2
(45) Date of Patent: Aug. 22, 2023

(54) CABLE RETENTION DEVICE, SYSTEM AND METHOD

(71) Applicant: CommScope Technologies LLC, Hickory, NC (US)

(72) Inventors: John T. Pfarr, Le Sueur, MN (US); Kenneth Allen Skluzacek, Belle Plaine, MN (US); Cyle D. Petersen, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/451,500

(22) Filed: Oct. 20, 2021

(65) Prior Publication Data

US 2022/0149609 A1 May 12, 2022

Related U.S. Application Data

(60) Provisional application No. 63/094,743, filed on Oct. 21, 2020.

(51) Int. Cl.
*H02G 15/00* (2006.01)
*H02G 15/06* (2006.01)
*H02G 1/08* (2006.01)

(52) U.S. Cl.
CPC ............. *H02G 15/06* (2013.01); *H02G 1/081* (2013.01)

(58) Field of Classification Search
CPC ................................ H02G 15/06; H02G 1/081
See application file for complete search history.

(56) References Cited

U.S. PATENT DOCUMENTS

| | | | |
|---|---|---|---|
| 3,837,047 A | 9/1974 | Bunnell | |
| 4,366,938 A | 1/1983 | McSpadden | |
| 6,993,237 B2 | 1/2006 | Cooke et al. | |
| 7,017,237 B2 | 3/2006 | Magno, Jr. et al. | |
| 8,276,244 B2 | 10/2012 | Vermeer et al. | |
| 8,415,564 B2 | 4/2013 | Seraj et al. | |
| 8,991,774 B2 | 3/2015 | Hajduch | |
| 9,021,665 B2 | 5/2015 | Chen | |
| 9,334,091 B2 | 5/2016 | Zantout et al. | |
| 10,007,081 B2 * | 6/2018 | Balfour, Jr. | G02B 6/4477 |
| 10,065,777 B2 | 9/2018 | King | |
| 10,689,173 B2 | 6/2020 | King | |
| 2012/0180270 A1 * | 7/2012 | Marmelstein | B65D 63/1018 24/16 R |
| 2013/0255037 A1 * | 10/2013 | Rouleau | H02G 3/30 24/16 R |

OTHER PUBLICATIONS

Press release BoxID: 972255 (HellermannTyton), TRAKO 2019: Versatile and durable cable clamp reduces rolling stock part diversity, downloaded from https://www.pressebox.com/pressrelease/hellermanntyton-gmbh/TRAKO-2019-Versatile-and-durable-cable-clamp-reduces-rolling-stock-part-diversity/boxid/972255 on Oct. 19, 2020.

Hellermann Tyton, P-clamps for mounting cables and hoses, Ratchet P-Clamp will streamline your cable management, downloaded from https://www.hellermanntyton.com/competences/p-clamp on Oct. 19, 2020.

* cited by examiner

*Primary Examiner* — Pete T Lee
(74) *Attorney, Agent, or Firm* — Merchant & Gould P.C.

(57) ABSTRACT

A system for gripping the outside jacket of a cable including a flexible gripper having a serpentine shape, teeth on one side and retention channels on another side. The retention channels each receive a cable tie.

18 Claims, 7 Drawing Sheets

CABLE RETENTION DEVICE, SYSTEM AND METHOD

This application claims priority to U.S. Provisional Patent Application 63/094,743, filed Oct. 21, 2020. The entire content of the priority application is hereby incorporated by reference.

BACKGROUND

There are situations when it is desired to grip onto the outside of a cable. Various devices may be used for mounting to a cable, such as to mount the cable to another device or structure, or to connect a pulling device to the cable for use in pulling the cable from one location to another such as through conduit. Improvements related to devices to be installed on cables are desired.

SUMMARY

The present disclosure is directed generally to cable management systems. In particular, the present disclosure relates to a cable retention grip and a system for using it.

The system first includes a cable having a circumference and a jacket. The system also includes a retention grip that has a flexible main body positioned around the circumference of the cable and selectively engaged with the jacket of the cable.

The main body has a thickness, a length, a width, a first side, a second side, a first edge, a second edge, and a longitudinal axis. The main body also has a plurality of slots extending from the first edge and the second edge a distance greater than the distance from either edge to the longitudinal axis, but a distance less than the width.

A retention channel is disposed on the first side of the main body and extends along the length of the retention grip. The retention channel has a depth less than the thickness. The main body also has a grip surface disposed on the second side, wherein the grip surface has a projection providing increased contact surface area when the retention grip is engaged with the jacket of the cable. Finally, a tie is positioned in the retention channel to secure the retention grip to the cable.

In certain embodiments, the grip surface of the retention grip includes a plurality of v-shaped teeth. In certain other embodiments, the grip surface may have other profiles, as desired.

In certain embodiments, the slots that extend from the first edge alternate with the slots that extend from the second edge, such that each successive slot extends from the opposite edge. Such a configuration results in the main body having a serpentine shape, which increases the flexibility of the retention grip when compared to a solid strip of material.

DETAILED DESCRIPTION

Turning now to the drawings, the present disclosure relates to a device, system and method for gripping a cable. In particular, the present invention relates to gripping a cable, such as during installation of a cable with equipment or while pulling a cable through conduit.

It is desirable in some circumstances to be able to quickly and temporarily attach a flexible gripping device to a cable to provide a stop for a pulling sock or any other feature on the cable. In certain other circumstances, it is desirable to attach a flexible gripping device to a cable underneath a pulling sock to increase the force needed to pull the pulling sock off of the cable.

One example is to provide a stop for a pulling sock or any other feature on a cable that may be pulled from one location to another such as through conduit. Cables vary in diameter and have jackets made of various materials. Improvements related to flexible wraps that can be quickly installed on cables but are able to withstand various pulling forces are desired.

Figures 1, 2:
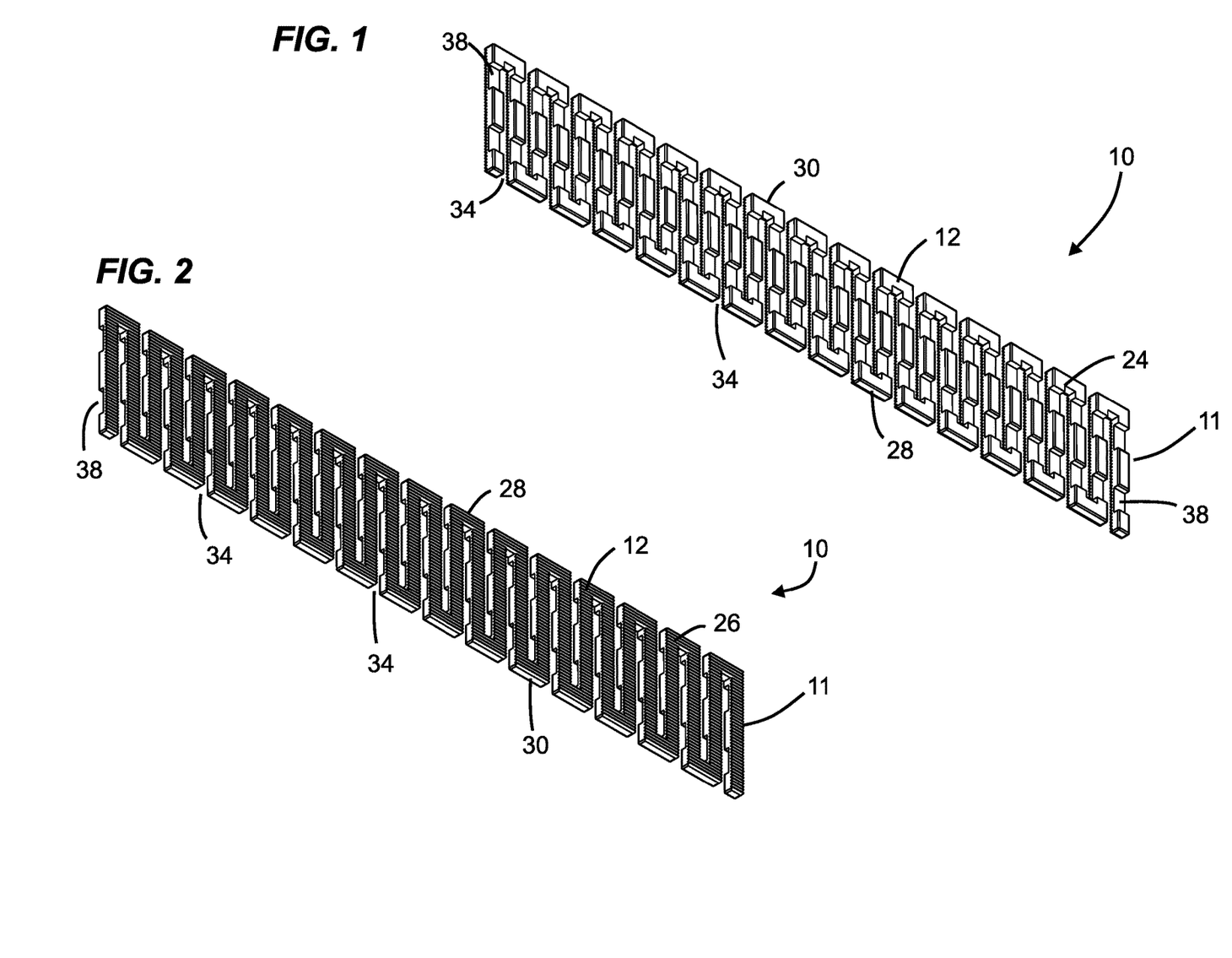
FIG. 1 is a perspective view of one embodiment of a cable retention grip in accordance with the principles of this disclosure.
FIG. 2 is another perspective view of the cable retention grip of FIG. 1.

Turning to FIG. 1, one embodiment of a cable retention grip 10 in accordance with the principles of this disclosure is shown. In the embodiment shown, cable retention grip 10 comprises a main body 12 made of a unitary piece of material that can be selectively wrapped around a cable 14 having an outside jacket 15 and secured using any suitable means. In the embodiment shown, cable retention grip 10 is secured to cable 14 by cable ties 16. In the embodiment shown, cable ties 16 are typical ratchet style zip ties. Any other suitable means including, but not limited to, hose clamps, may be used instead of cable ties 16 without departing from the principles of the disclosure.

In the embodiment shown, cable retention grip 10 has a generally rectangular shape overall and is made of a resilient material that is flexible enough that it can be easily wrapped around cables of a desired diameter. Some example cable diameters are from 0.25 inches to 1.5 inches in outer diameter, but other cable diameters may alternatively be used as well. Cable 14 can be a telecommunications cable (fibers or copper conductors), a power cable, a hybrid cable, or any other suitable cable.

Some non-limiting examples of materials that could be used to make cable retention grip 10 include injection molded nylon, rubber, or other resilient material. In certain embodiments, cable retention grip may be manufactured in long strips that users can cut to a desired size at the point of use. Of course, any suitable material may alternatively be used without departing from the invention.

Figures 3, 4:
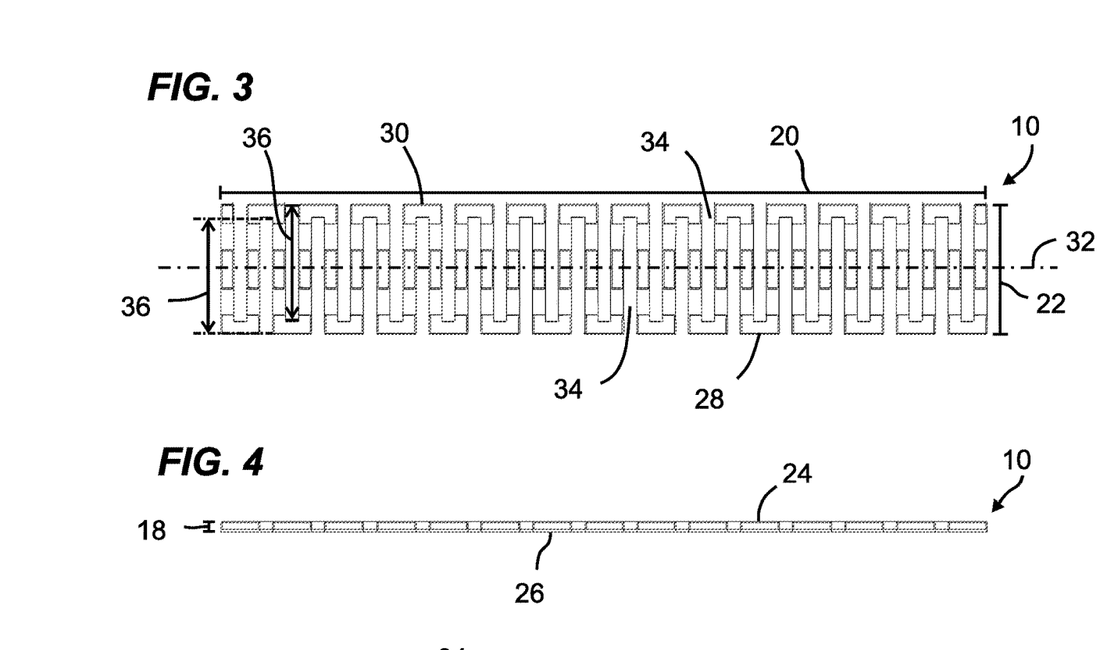
FIG. 3 is a top view of the cable retention grip of FIG. 1.
FIG. 4 is a front view of the cable retention grip of FIG. 1.
Figure 5:
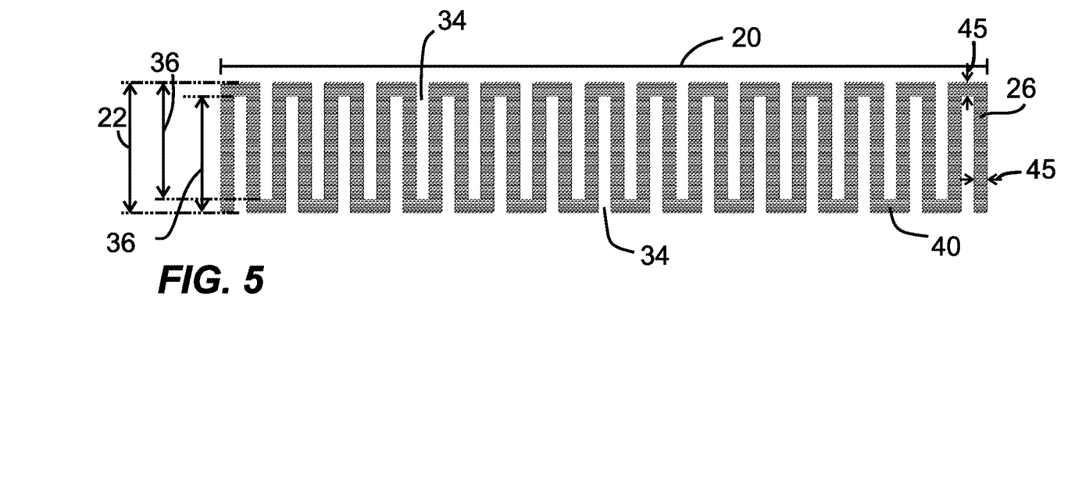
FIG. 5 is a bottom view of the cable retention grip of FIG. 1.
Figure 6:
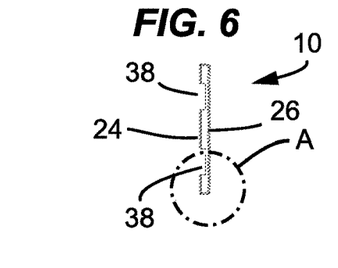
FIG. 6 is a side view of the cable retention grip of FIG. 1.
Figure 7:
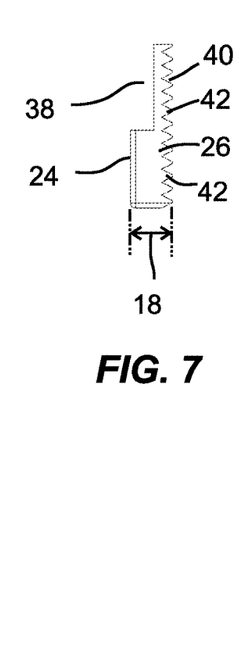
FIG. 7 is a detail view of the cable retention grip of FIG. 1, taken generally along line A in FIG. 6.
Figure 8:
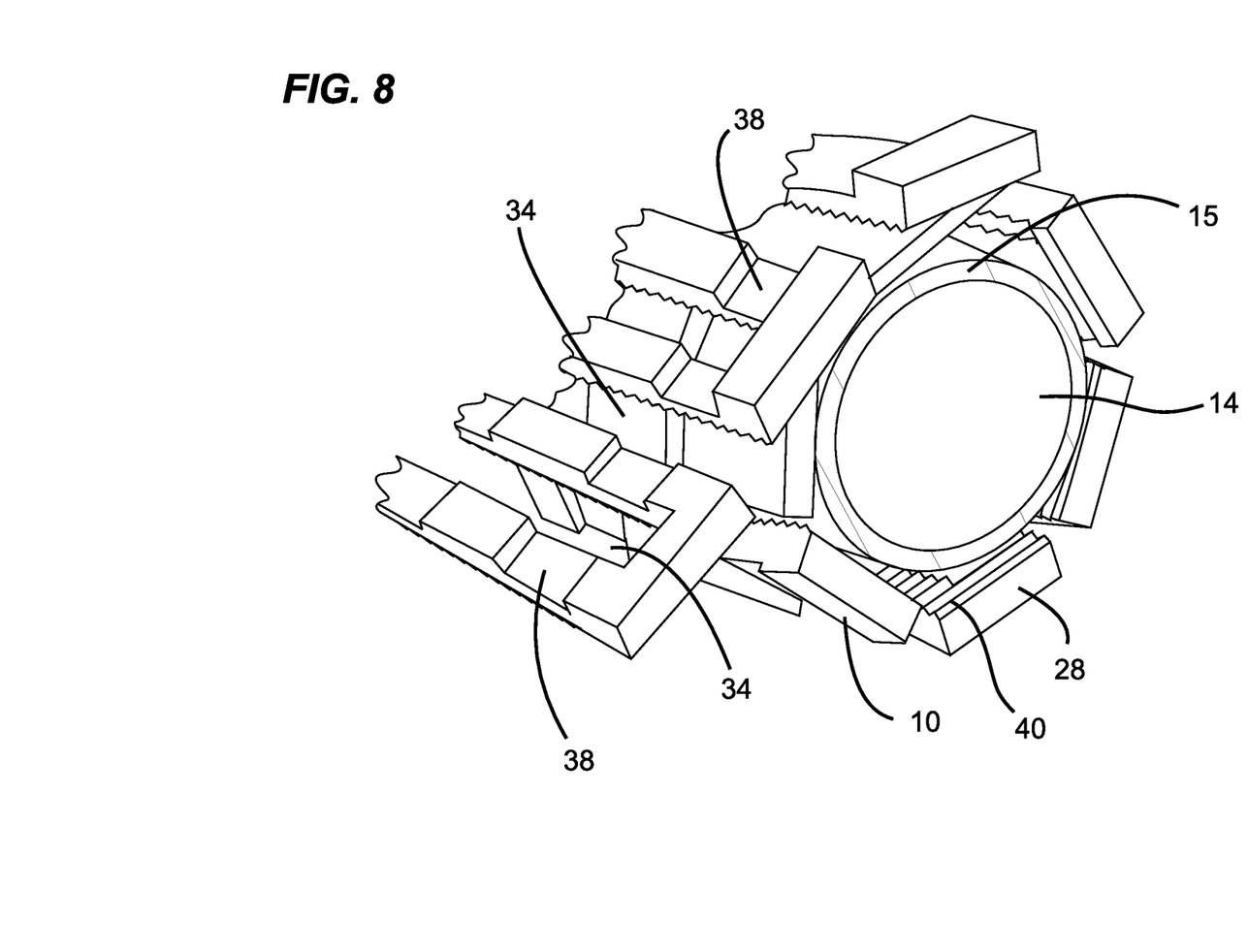
FIG. 8 is a schematic view of the cable retention grip of FIG. 1, showing the grip wrapped around a cable.

Turning now to FIGS. 3-7, orthogonal views of a strip 11 of cable retention grip 10 are shown. The strip 11 is shown in these views in an unwrapped state. As shown, main body 12 includes a thickness 18, a length 20, a width 22, a first side 24, a second side 26, a first edge 28, a second edge 30, and a longitudinal axis 32. As shown in FIGS. 3 and 5, a plurality of slots 34 extend from first edge 28 and second edge 30. In the embodiment shown, the slots 34 alternate between extending a distance 36 from the first edge 28 and the second edge 30 and are distributed evenly along the length 20. Distance 36 is less than the width 22, but greater than the distance from either edge 28, 30 to the longitudinal axis 32. The resulting shape of cable retention grip 10 is serpentine. This serpentine shape makes cable retention grip 10 easier to bend than a solid rectangular or square strip of material. Distance 36 may by any suitable length, may be any desired shape, and may be distributed in any desired distance along length 20 without departing from the principles of this disclosure.

In one example, width 22 is approximately 1 inch, length 20 is approximately 5.9 inches, and thickness 18 is approximately 0.08 inches. The serpentine portion 45 is approximately 0.1 inches wide and each slot 34 is also approximately 0.1 inches wide. Of course, the aforementioned dimensions may vary as desired without departing from the spirit of this disclosure. For example, plus or minus 10 percent on the noted dimensions is possible. Also, length 20 can be any desired length, such as 3, 4, 5, 6, 7, 8, 9, or 10 inches long. Length 20 can be a suitable length to where it does not need to be cut shorter (or only minimally cut shorter to reduce waste) in some cases as it can sized for cables 14 of desired usage. For smaller cable, the strip 11 can be cut to the desired length so it is wrapped to the circumference of the cable 14, or enough to securely grip the cable 14 once ties 16 are added.

Figure 10:
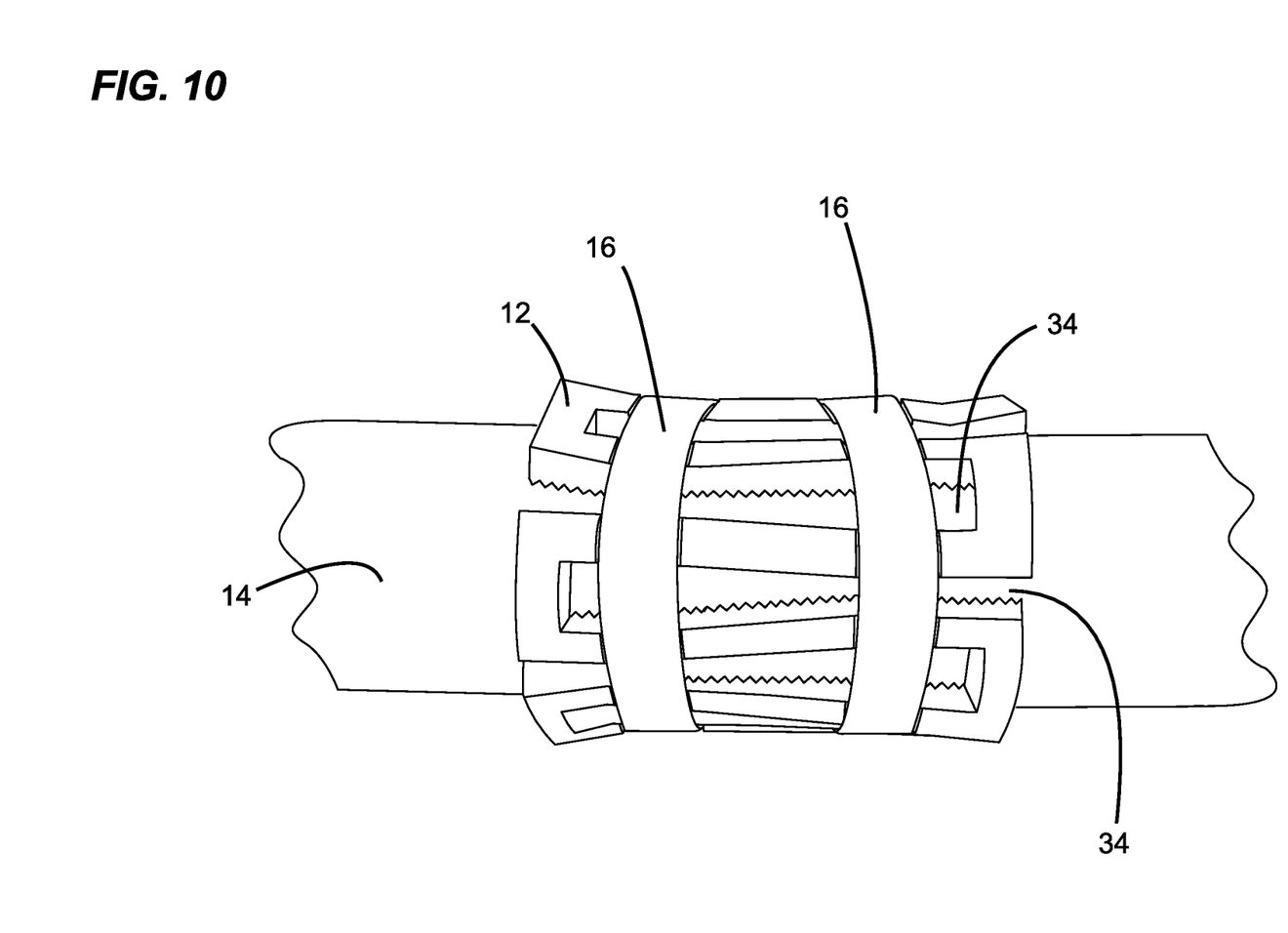
FIG. 10 is another schematic view of the cable retention grip of FIG. 1, showing the grip wrapped around a cable.
Figure 11:
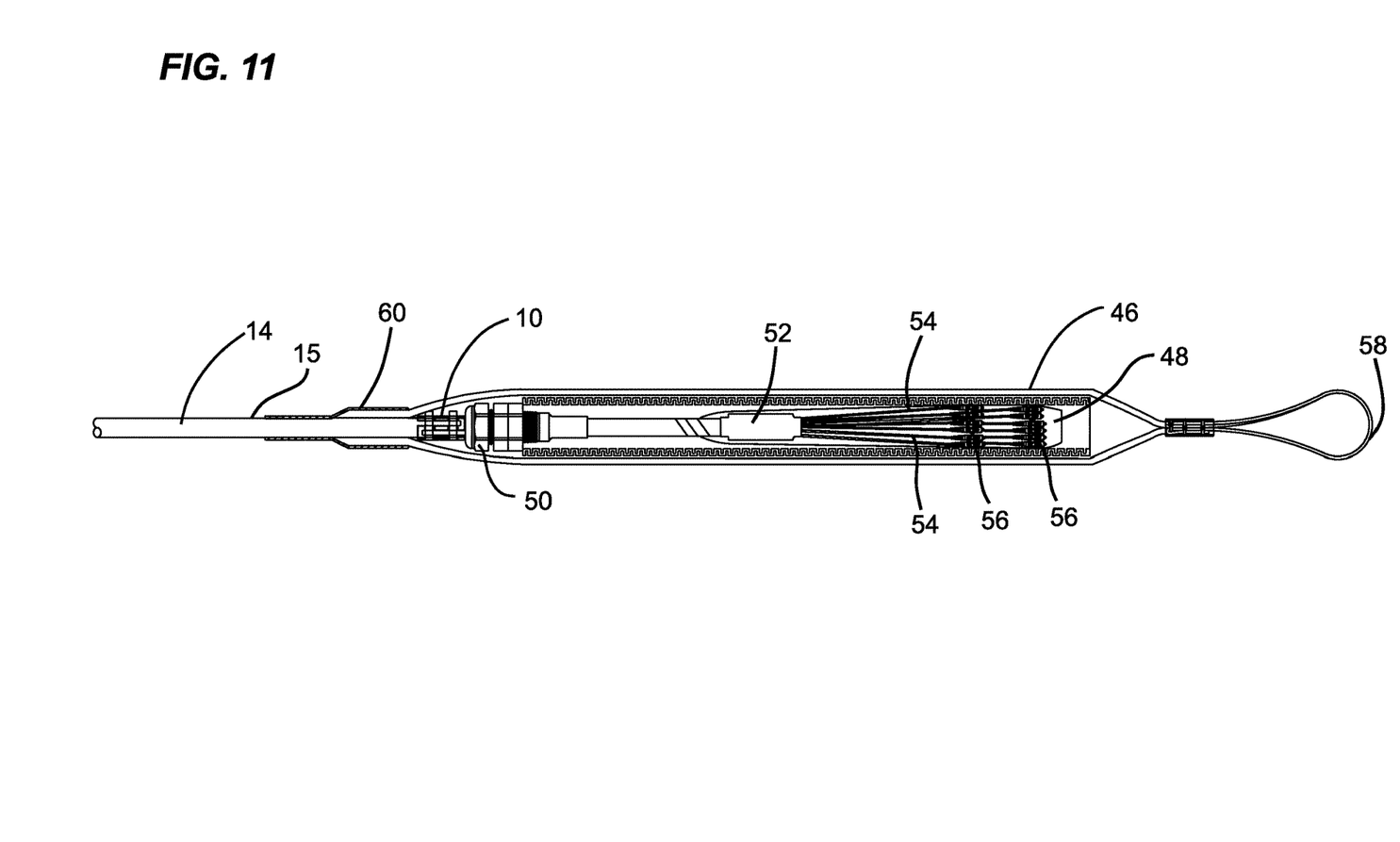
FIG. 11 is another schematic view of the cable retention grip of FIG. 1, showing the grip installed under a pulling sock.

In the embodiment shown, two retention channels 38 are disposed on first side 24 and extend along the length 20. Retention channels 38 have a depth that is less than the thickness 18. As shown in FIGS. 10-11, cable ties 16 may be used to secure the cable retention grip 10. A user can attach cable retention grip 10 to cable 14 by wrapping the cable retention grip 10 around the cable, securing it in place by securing a cable tie 16 each into retention channel 38, and cinching the cable ties tight to fully engage the second side of cable retention grip 10 with cable 14.

As previously indicated, cable ties 16 may be replaced by any other suitable retention strap without departing from the principles of this disclosure. In certain embodiments, cable retention grip 10 may be wrapped completely or only partially around cable 14 without departing from the principles of this disclosure.

In certain embodiments the size and positioning of the retention channels 38 may vary to accommodate cable ties 16 of varying widths and thicknesses without departing from the principles of the disclosure. In addition, although two retention channels 38 are shown, certain embodiments may include more or fewer retention channels without departing from the principles of the disclosure. For example, 1, 2, 3, 4 and 5 or more retention channels 38 may be provided. Increasing the number of retention channels 38 may increase the holding force of cable retention grip 10 on cable 14 to prevent slippage.

Figure 9:
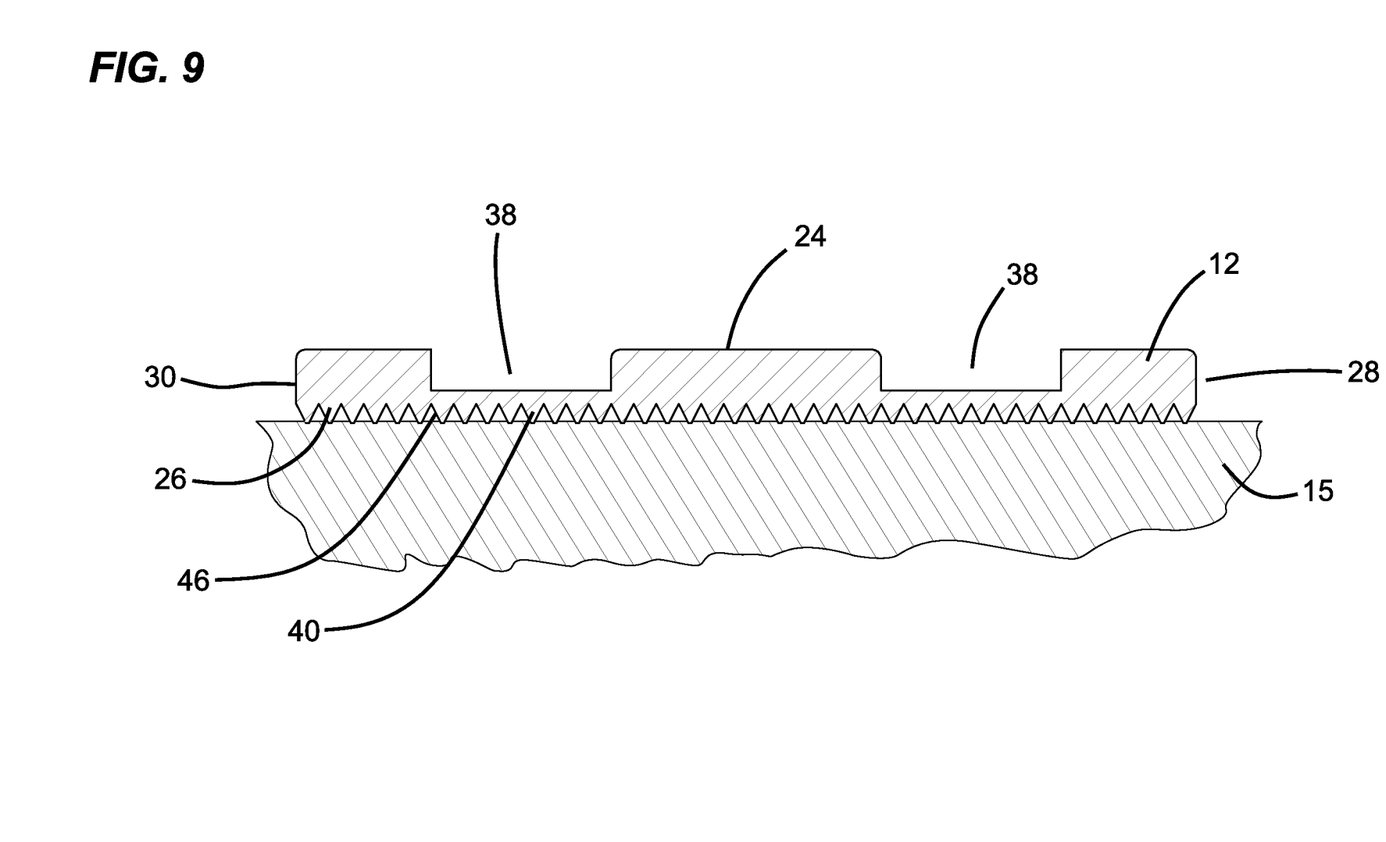
FIG. 9 is a schematic section view of the cable retention grip of FIG. 1, showing the interaction between the grip and the cable.

Turning now to FIGS. 5-10, cable retention grip 10 further includes a grip surface 40 on the second side 26 of the grip. In the embodiment shown, grip surface 40 includes one or more projections to engage the jacket 15. In one example, a plurality of lines of v-shaped teeth 42 integrally formed into the second side 26 of cable retention grip 10 are provided. As shown in FIG. 9, when cable retention grip 10 is attached to cable 14, teeth 42 engage the outside jacket 15 of cable 14. Teeth 42 help increase the surface area in contact with jacket 15. In certain embodiments, teeth 42 may have any shape or size without departing from the principles of this disclosure.

One method of manufacture is to mold the grip 10 as a strip 11 of several inches long along the axis 32, and then have it cut to length in the field for the particular cable to be gripped. Another method is to extrude the grip as a solid shape and then make the cut outs or slots 34 to form the serpentine shape. Similarly, the strip of grip 10 can be cut to length in the filed for the particular cable to be gripped.

Turning now to FIG. 11, a cable 14 is shown with a pulling sock 46 attached to a connectorized end 48 of the cable. In the embodiment shown, pulling sock 46 covers the connectorized end 48 and a length of cable 14. Cable 14 also has a breakout device 52 which breaks out the fibers into single fibers for LC connectors or multiple fibers for MPO connectors 56. In alternative embodiments, cable 14 may or may not be connectorized.

Pulling sock 46 is made of any suitable material, including but not limited to nylon mesh and wire mesh. Pulling sock 46 includes a pulling end 58. Cable retention grip 10 is installed on cable 14 prior to installation of pulling sock 46 and, in the embodiment shown, is positioned in front of a grommet or cable gland 50. When used in this way, cable retention grip 10 helps to attach pulling sock 46 to the cable 14 and provides additional grip to hold the pulling sock 46 in place when pulling force is applied to the pulling end 58. Heat shrink wrap 60, with or without heat activated adhesive, may be installed at one end of pulling sock 46 and engages grip 10 to retain pulling sock 46 with cable 14 during the pulling operation. In the embodiment shown in FIG. 11, the addition of cable retention grip 10 to the typical configuration of a pulling sock 46 secured by heat shrink wrap 60 provides additional grip strength to resist slipping of the pulling sock off of the cable 14 during certain pulling operations.

In certain embodiments, cable retention grip 10 may be more easily installed in the field than heat shrink wrap 60. If the required pulling force is low enough, cable retention grip 10 may be used as a replacement to heat shrink wrap 60. In such an application, cable retention grip may be wrapped around a cable 14. Pulling sock 46 would be installed over the cable retention grip 10, and cable ties, like ties 16, could be secured on top of pulling sock 46 and cinched around cable 14, such that pulling sock material would be positioned between the cable ties and the cable retention grip. One additional advantage of cable retention grip 10 as a replacement option for heat shrink wrap 60 or other gripping solutions is that cable retention grip 10 may be easily removed from cable 14, leaving no damage, such as adhesive, to the cable after removal.

Figure 12:
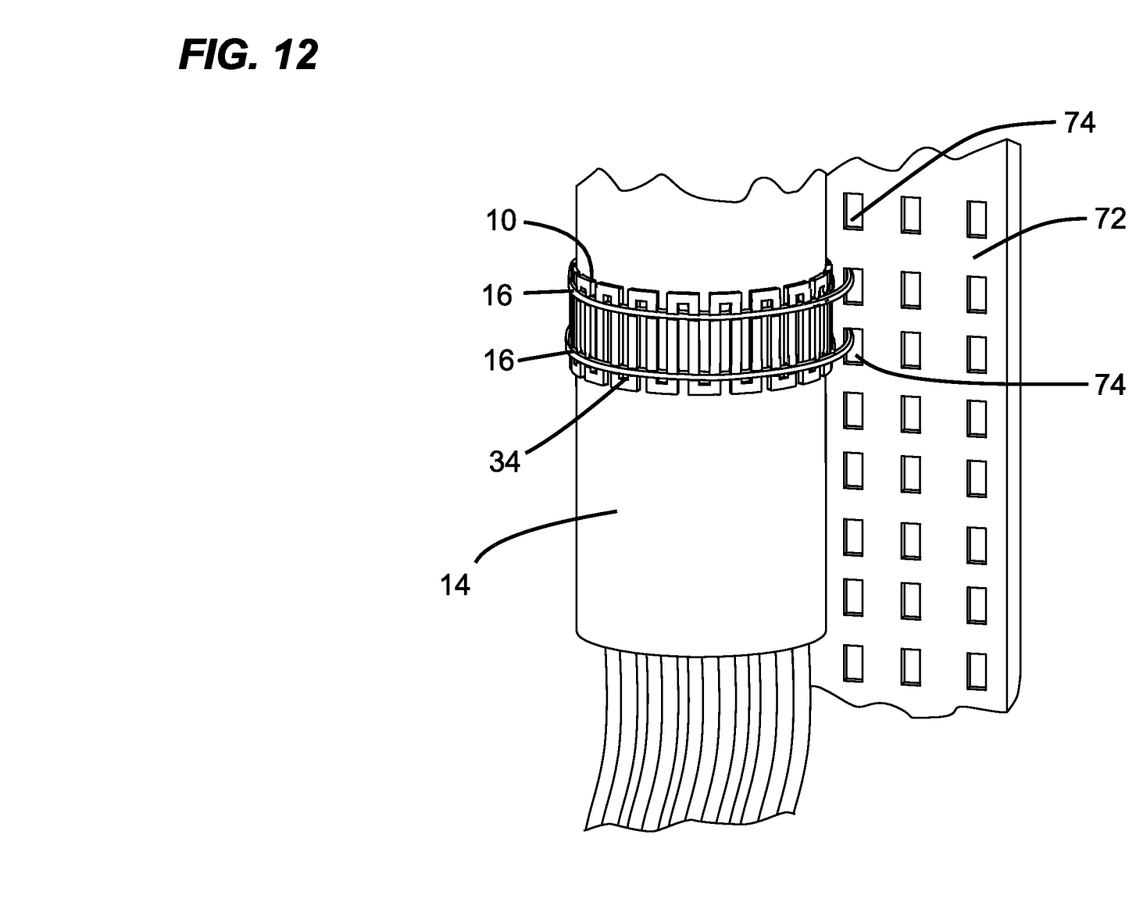
FIG. 12 is another schematic view of the cable retention grip of FIG. 1, showing the grip attached to a cable and also attached to a panel by using cable ties.

FIG. 12 shows a cable 14 that is secured to a panel 72 by cable ties 16. As shown, cable retention grip 10 is wrapped around cable 14. Cable ties 16 are then wrapped around cable retention grip 10, disposed in the retention channels 38, and passed through holes 74 in panel 72. As shown, cable retention grip 10 provides a secure panel mounting solution that is easy to install quickly and may be used temporarily or for a longer period of time.

Although the embodiments described herein disclose what is perceived to be the most practical and preferred embodiments, this disclosure is not intended to be limited to the specific embodiments set forth above. Rather, modifications may be made by one of skill in the art without departing from the spirit or intent of the disclosure.

What is claimed is:

1. A system for retaining a cable comprising:
a cable having a circumference and a jacket;
a retention grip having a flexible main body, positioned around the circumference of the cable, and engaged with the jacket of the cable;
the main body having a thickness, a length, a width, a first side, a second side, a first edge, a second edge, and a longitudinal axis;
the main body having a plurality of slots extending from the first edge and the second edge a distance greater than the distance from either edge to the longitudinal axis, but a distance less than the width;
the main body having a retention channel disposed on the first side, the retention channel extending the length of the retention grip and having a depth less than the thickness;
the main body having a grip surface disposed on the second side, the grip surface having a projection providing increased contact surface area when the retention grip is engaged with the jacket of the cable; and
a cable tie positioned in the retention channel, securing the retention grip to the cable.

2. The system of claim 1, wherein the slots extending from the first edge alternate with the slots extending from the second edge, such that each successive slot extends from the opposite edge.

3. The system of claim 1, wherein the retention grip is made of injected molded nylon.

4. The system of claim 1, wherein the grip surface includes a plurality of v-shaped teeth.

5. A method of temporarily gripping a cable comprising the steps of:
providing a cable having a diameter and a circumference, the cable further including a jacket;
wrapping a flexible retention grip around the jacket, the flexible retention grip having a main body, the main body having a thickness, a length, a width, a first side, a second side, a first edge, a second edge, and a longitudinal axis;
the flexible retention grip further including a plurality of slots extending from the first edge to the second edge a distance greater than the distance from either edge to the longitudinal axis, but a distance less than the width;
the flexible retention grip further including a retention channel disposed on the first side, the retention channel extending the length of the retention grip and having a depth less than the thickness;
the flexible retention grip further including a grip surface disposed on the second side; and
securing the flexible retention grip to the cable with a cable tie positioned in the retention channel such that the grip surface engages the jacket of the cable.

6. The method of claim 5, wherein the flexible retention grip is secured using a cable tie cinched around the flexible retention grip and disposed in the retention channel.

7. The method of claim 5, wherein the positioning of the slots results in the main body having a serpentine shape.

8. The method of claim 5, further including a step of passing the cable tie through a hole in a panel before it is cinched around the flexible retention grip to secure the cable to the panel.

9. A flexible retention grip comprising:
a main body having a thickness, a length, a width, a first side, a second side, a first edge, a second edge, and a longitudinal axis;
a plurality of slots extending from the first edge and the second edge a distance greater than the distance from either edge to the longitudinal axis, but a distance less than the width;
a retention channel disposed on the first side, the retention channel extending the length of the retention grip and having a depth less than the thickness; and
a grip surface disposed on the second side, the grip surface providing increased contact surface area when the grip is tightened onto a cable.

10. The flexible retention grip of claim 9, wherein the retention grip is made of a unitary piece of injection molded nylon.

11. The flexible retention grip of claim 9, wherein two retention channels are positioned on either side of the longitudinal axis.

12. The flexible retention grip of claim 9, wherein the grip surface includes a plurality of v-shaped teeth.

13. The flexible retention grip of claim 9, wherein the slots extending from the first edge alternate with the slots extending from the second edge, such that each successive slot extends from the opposite edge.

14. The flexible retention grip of claim 9, wherein the positioning of the slots results in the main body having a serpentine shape.

15. A system for retaining a cable comprising;
a cable having a circumference and a jacket;
a retention grip having a flexible main body, positioned around the circumference of the cable, and engaged with the jacket of the cable;
the main body having a serpentine shape;
the main body having a retention channel disposed on an exterior side, the retention channel extending a length of the retention grip;
the main body having a grip surface disposed on an interior side, the grip surface having a plurality of projections engaged with the jacket of the cable; and
a tie positioned in the retention channel, securing the retention grip to the cable.

16. The system of claim 15, wherein the projections of the grip surface include a plurality of v-shaped teeth.

17. The system of claim 1, further comprising a pulling sock attached to the cable,
wherein the retention grip is located inside of the pulling sock.

18. The system of claim 1, further comprising a fiber breakout, and a plurality of fibers, and fiber connector terminating each of the fibers or groups of the fibers.

* * * * *

UNITED STATES PATENT AND TRADEMARK OFFICE
CERTIFICATE OF CORRECTION

| | | |
|---|---|---|
| PATENT NO. | : 11,735,900 B2 | Page 1 of 1 |
| APPLICATION NO. | : 17/451500 | |
| DATED | : August 22, 2023 | |
| INVENTOR(S) | : John T. Pfarr | |

It is certified that error appears in the above-identified patent and that said Letters Patent is hereby corrected as shown below:

In the Claims

Column 6, Line 56, Claim 18: "and fiber connector" should read --and a fiber connector--

Signed and Sealed this
Second Day of July, 2024

Katherine Kelly Vidal
*Director of the United States Patent and Trademark Office*